(12) United States Patent
Carlough et al.

(10) Patent No.: US 10,416,962 B2
(45) Date of Patent: Sep. 17, 2019

(54) DECIMAL AND BINARY FLOATING POINT ARITHMETIC CALCULATIONS

(71) Applicant: INTERNATIONAL BUSINESS MACHINES CORPORATION, Armonk, NY (US)

(72) Inventors: Steven R. Carlough, Poughkeepsie, NY (US); Juergen Haess, Boeblingen (DE); Michael Klein, Boeblingen (DE); Klaus M. Kroener, Boeblingen (DE); Petra Leber, Boeblingen (DE); Silvia M. Mueller, Boeblingen (DE); Kerstin Schelm, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 14/873,469

(22) Filed: Oct. 2, 2015

(65) Prior Publication Data

US 2016/0098249 A1    Apr. 7, 2016

(30) Foreign Application Priority Data

Oct. 6, 2014    (GB) .................................. 1417582.2

(51) Int. Cl.
*G06F 7/485*    (2006.01)
*G06F 5/01*    (2006.01)

(52) U.S. Cl.
CPC .............. *G06F 7/485* (2013.01); *G06F 5/012* (2013.01); *G06F 2205/003* (2013.01); *G06F 2207/3812* (2013.01); *G06F 2207/483* (2013.01)

(58) Field of Classification Search
CPC ...................................................... G06F 7/485
See application file for complete search history.

(56) References Cited

U.S. PATENT DOCUMENTS 6,199,089 B1 *  3/2001  Mansingh ............... G06F 7/485
                                                      708/497
6,205,461 B1    3/2001  Mansingh
                         (Continued)

OTHER PUBLICATIONS

Wang et al., "Decimal Floating-Point Adder and Multifunction Unit with Injection-Based Rounding", Computer Arithmetic, ARITH '07, 18th IEEE Symposium, Jun. 25-27, 2007, pp. 56-68, (Abstract Only; 1 page).

Tsen et al., "Hardware Design of a Binary Integer Decimal-Based Floating-Point Adder", 25th International Conferene on Computer Design, ICCD 2007, Oct. 7-10, 2007 (pp. 288-295).

Wang et al., "Hardware Designs for Decimal Floating-Point Addition to Related Operations", IEEE Transactions on Computers, vol. 58, No. 3 (Mar. 2009) (pp. 322-335).

(Continued)

*Primary Examiner* — Andrew Caldwell
*Assistant Examiner* — Emily E Larocque
(74) *Attorney, Agent, or Firm* — William A. Kinnaman, Esq.; Kevin P. Radigan, Esq.; Heslin Rothenberg Farley & Mesiti P.C.

(57) ABSTRACT

Logic is provided for performing decimal and binary floating point arithmetic calculations on first and second operands. The method includes: receiving the first and second operands in packed format; unpacking the first and second operands; swapping the first operand to a fourth operand and the second operand to a third operand, if an exponent of the first operand is less than an exponent of the second operand, otherwise storing the first operand to the third operand and the second operand to the fourth operand; aligning the third operand and the fourth operands based on the exponent difference of the third and fourth operand and a number of leading zeroes of the third operand; performing an add/subtract operation on the aligned third and fourth operands with normalizing and rounding between the operands; and packing the result obtained from the add/subtract.

17 Claims, 10 Drawing Sheets

(56) References Cited

U.S. PATENT DOCUMENTS

| | | |
|---|---|---|
| 7,054,898 B1 | 5/2006 | Tzeng et al. |
| 7,519,645 B2 | 4/2009 | Carlough et al. |
| 7,546,328 B2 | 6/2009 | Schulte et al. |
| 7,752,165 B2 | 7/2010 | Ireland et al. |
| 8,161,091 B2 | 4/2012 | Carlough et al. |
| 8,407,275 B2 | 3/2013 | Boersma et al. |
| 8,554,822 B2 | 10/2013 | Carlough et al. |
| 8,572,141 B2 | 10/2013 | Carlough et al. |
| 8,601,047 B2 | 12/2013 | Wang |
| 2006/0047739 A1 | 3/2006 | Schulte et al. |
| 2012/0259904 A1* | 10/2012 | Bishop .................... H03M 7/02 708/503 |
| 2013/0124588 A1 | 5/2013 | Kroener et al. |
| 2014/0019506 A1 | 1/2014 | Kuo |
| 2014/0095563 A1 | 4/2014 | Lundvall et al. |

OTHER PUBLICATIONS

Schwartz et al., "Decimal Floating-Point Support on the IBM System z10 Processor", IBM Journal of Research & Development, vol. 58, Issue 1 (2009).

El-Ghamrawy, KY, A Mixed Decimal/Binary Redundant Floating-Point Adder), Faculty of Engineering, Cairo University, Giza, Egypt (2011) (78 pages).

Search Report for United Kingdom Application No. GB1417580.6, filed Oct. 6, 2014, dated Apr. 15, 2015 (4 pages).

Search Report for United Kingdom Application No. GB1417582.2, filed Oct. 6, 2015, dated Apr. 15, 2015 (3 pages).

* cited by examiner

DECIMAL AND BINARY FLOATING POINT ARITHMETIC CALCULATIONS

PRIOR FOREIGN APPLICATION

This application claims priority from United Kingdom (GB) patent application number 1417582.2, filed Oct. 6, 2014, which is hereby incorporated herein by reference in its entirety.

BACKGROUND

The present invention relates in general to data processing systems, and in particular, to a method for performing floating point arithmetic calculations in decimal or binary floating point format as well as to a decimal floating point unit and a data processing system.

The "IEEE-754R Standard for Binary Floating Point Arithmetic" specifies a floating point data architecture that is commonly implemented in computer hardware, such as floating point processors having multipliers. The format consists of a sign, an unsigned biased exponent, and a significand. The sign bit is a single bit and is represented by an "S". The unsigned biased exponent, represented by an "e," is e.g. 8 bits long for single precision, 11 bits long for double precision and 15 bits long for quad precision. The significand is 24 bits long for single precision, 53 bits long for double precision and 112 bits long for quad precision.

Decimal floating point has been used in calculators for many years but the latest revision of the IEEE standard for floating point numbers, IEEE-754R, includes a decimal floating point format. Addition and subtraction are the primary arithmetic instructions and they are critical to the performance of a decimal floating point unit. Floating point arithmetic is more complex than fixed point arithmetic due to the requirement to align the operands. Typically, the time required for a decimal floating point addition or subtraction operation is limited to the time required for the case where both operands must be shifted prior to the adder operation. Decimal floating point formats, as defined by the IEEE 754R standard, include a double word format containing sixteen digits for the coefficient and a quad word format containing thirty-four digits for the coefficient. The coefficients are integer and are not normalized and therefore, can contain leading zeroes. With the advent of the new standard and the increase in the use of decimal arithmetic operations for financial calculations, it becomes desirable to implement these operations at a high performance.

U.S. Pat. No. 7,519,645 B2 discloses a method for performing a decimal floating point operation. The method includes receiving a first operand including a first coefficient and a first exponent. The method also includes receiving a second operand including a second coefficient and a second exponent. An operation associated with the first operand and the second operand is received. The operation is an addition or a subtraction. Three concurrent calculations are performed on the first operand and the second operand. The first concurrent calculation includes applying the operation to the first operand and the second operand based on a first assumption that the first exponent is equal to the second exponent. The applying the operation based on the first assumption results in a first result and includes utilizing a two cycle adder. The second concurrent calculation includes applying the operation to the first operand and the second operand based on a second assumption that an absolute difference between the first exponent and the second exponent is less than or equal to a number of leading zeroes in the coefficient of the operand with the larger exponent. The applying the operation based on the second assumption results in a second result and includes utilizing the two cycle adder. The third concurrent calculation includes applying the operation to the first operand and the second operand based on a third assumption that the absolute difference between the first exponent and the second exponent is greater than the number of leading zeroes in the coefficient of the operand with the larger exponent. The applying the operation based on the third assumption results in a third result and includes utilizing the two cycle adder. A final result is selected from the first result, the second result and the third result.

U.S. Pat. No. 7,519,645 B2 also discloses a system for performing a decimal floating point operation. The system includes a two cycle adder, a final result selector, and a mechanism for receiving a first operand including a first coefficient and a first exponent. The mechanism also receives a second operand including a second coefficient and a second exponent. An operation associated with the first operand and the second operand is received, where the operation is an addition or a subtraction. Three concurrent calculations are performed on the first operand and the second operand. The first concurrent calculation includes applying the operation to the first operand and the second operand based on a first assumption that the first exponent is equal to the second exponent. The applying the operation based on the first assumption results in a first result and includes utilizing the two cycle adder. The second concurrent calculation includes applying the operation to the first operand and the second operand based on a second assumption that an absolute difference between the first exponent and the second exponent is less than or equal to a number of leading zeroes in the coefficient of the operand with the larger exponent. The applying the operation based on the second assumption results in a second result and includes utilizing the two cycle adder. The third concurrent calculation includes applying the operation to the first operand and the second operand based on a third assumption that the absolute difference between the first exponent and the second exponent is greater than the number of leading zeroes in the coefficient of the operand with the larger exponent. The applying the operation based on the third assumption results in a third result and includes utilizing the two cycle adder. A final result is selected by the final result selector from the first result, the second result and the third result.

SUMMARY

In one or more aspects, a logic method is presented which includes performing decimal and binary floating point arithmetic calculations in a floating point unit on a first operand and a second operand, wherein the first operand and the second operand are both in either decimal or binary floating point format, and the first operand has a first magnitude and the second operand has a second magnitude. The performing includes: receiving the first operand and the second operand in packed format; unpacking the first operand and the second operand; swapping the first operand to a fourth operand and the second operand to a third operand, if an exponent of the first operand is less than an exponent of the second operand, otherwise storing the first operand to a third operand and the second operand to a fourth operand; aligning the third operand and the fourth operand based on the exponent difference of the third and fourth operands and a number of leading zeros of the third operand; performing an add/subtract operation on the aligned third operand and the aligned fourth operand and normalizing and rounding between the third operand and the fourth operand; and packing a result obtained from the performing of the add/subtract operation.

In another aspect, a logic device is presented which includes arithmetic logic circuitry for performing decimal and binary floating point arithmetic calculations in a floating point unit on a first operand and a second operand, wherein the first operand and the second operand are both in either decimal or binary floating point format, and the first operand has a first magnitude and the second operand has a second magnitude. The arithmetic logic circuitry is configured to implement a method comprising: receiving the first operand and the second operand in packed format; unpacking the first operand and the second operand; swapping the first operand to a fourth operand and the second operand to a third operand, if an exponent of the first operand is less than an exponent of the second operand, otherwise storing the first operand to a third operand and the second operand to a fourth operand; aligning the third operand and the fourth operand based on the exponent difference of the third and fourth operand and a number of leading zeros of the third operand; performing an add/subtract operation on the aligned third operand and the aligned fourth operand and normalizing and rounding between the third operand and the fourth operand; and packing a result obtained from the performing of the add/subtract operation.

In a further aspect, a computer program product is provided for performing decimal and binary floating point arithmetic calculations on a first operand and a second operand, the computer program product comprising a computer readable storage medium having program instructions embodied therewith, the program instructions being executable by a processor to cause the processor to perform a method comprising: receiving the first operand and the second operand in packed format; unpacking the first operand and the second operand; swapping the first operand to a fourth operand and the second operand to a third operand, if an exponent of the first operand is less than an exponent of the second operand, otherwise storing the first operand to a third operand and the second operand to a fourth operand; aligning the third operand and the fourth operand based on the exponent difference of the third and fourth operand and a number of leading zeros of the third operand; performing an add/subtract operation on the aligned third operand and the aligned fourth operand with normalizing and rounding between the third operand and the fourth operand; and packing a result obtained from the performing of the add/subtract operation.

BRIEF DESCRIPTION OF THE DRAWINGS

The present invention, together with certain objects and advantages thereof, may best be understood from the following detailed description of one or more embodiments thereof, but not restricted to the embodiments discussed. In the accompanying drawings.

DETAILED DESCRIPTION

Figure 1:
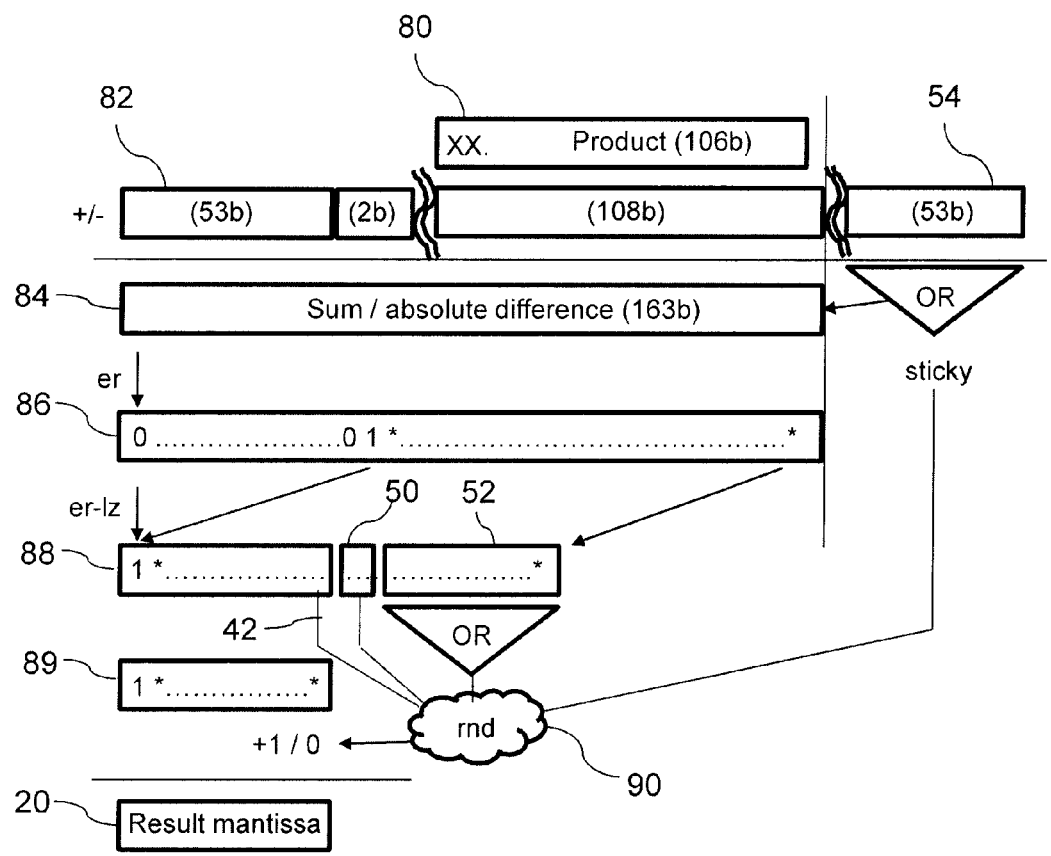
FIG. 1 depicts a 64 b binary floating point unit based on a fused multiply add operation according to state of the art.

Those skilled in the art will note from the description provided herein that an objective of the present invention is to provide a method for performing decimal and binary floating point arithmetic calculations in a floating point unit with extended precision and improved efficiency.

Another objective is to provide a floating point unit as well as a data processing system for performing such decimal and binary floating point arithmetic calculations with extended precision and improved efficiency.

These objectives are achieved by the features of the independent claims. The other claims, the drawings and the specification disclose advantageous embodiments of the invention.

According to one or more aspects of the present invention, a method is provided for performing decimal and binary floating point arithmetic calculations in a floating point unit on a first operand and a second operand, wherein the first operand and the second operand are both in the same of either decimal or binary floating point format, wherein the first operand has a first magnitude and the second operand has a second magnitude, the method comprising: (i) receiving the first operand and the second operand in packed format; (ii) unpacking the first operand and the second operand; (iii) swapping the first operand to a fourth operand and the second operand to a third operand, if an exponent of the first operand is less than an exponent of the second operand, otherwise storing the first operand to a third operand and the second operand to a fourth operand; (iv) aligning the third operand and the fourth operand based on the exponent difference of the third and fourth operand and a number of leading zeroes of the third operand; (v) performing an add/subtract operation on the aligned third operand and the aligned fourth operand with normalizing and rounding; and (vi) packing the result obtained from this operation.

The inventive method enhances, for instance, a 128 b decimal floating point unit (DFU) to also execute BFP-128b in the same hardware, which may be performed in a fully pipelined fashion, but which is not restricted to be performed in pipelined fashion, and which requires an arithmetical engine to support decimal and binary arithmetic, and to support decimal and binary IEEE rounding.

Enhancing a 128 b decimal floating point unit in such a way has several advantages. For instance, it reduces the latency of a BFP-128b add/subtract operation and increases the throughput. Further, moving the BFP 128 b instructions to the DFU makes the binary floating point unit (BFU) simpler and smaller, and even allows making it faster. In addition, by sharing the DFU hardware, it provides an overall savings in area and power. Thus, it becomes a key differentiating feature compared to other platforms.

Some processors already have an FPU with a wide dataflow, such as that those containing a decimal FPU. In the execution scheme of a DFP, the mantissa dataflow is between 136b and 144b wide. Therefore the operands received are unpacked first to the wider mantissa width for performing the floating point operation and after receiving the final result, the result is packed again to the original bit width. The DFU swaps and aligns the first and the second operand. When executing a BFP-128b add operation (113b mantissa) on such a dataflow, the arithmetic can be done with a 116b wide adder, since the second operand only sticks out to the right not to the left. Thus, the DFU-128b dataflow is wide enough for BFP-128b. Thus a fully pipelined DFU dataflow with the extensions needed to execute BFP-128b may be implemented according to the inventive method.

With the inventive method disclosed herein, a BFP-128b operation can be implemented in a fully pipelined fashion on a 9 cycle pipeline, but is not restricted to such a pipelined fashion.

With the inventive method presented, a BFP 128 operation can be implemented sharing very most of the components that are used for DFU 128 b.

In one or more advantageous embodiments, the present invention may comprise performing an add/subtract operation with normalizing or rounding between the first operand and the second operand, and include: (i) in case of the floating point operands being in a binary floating point format, mapping the binary floating point operands to a decimal floating point format, by padding bits to form digits in order to share the same fields as in case of the floating point operands being in a decimal floating point format; (ii) generating a guard digit of zero of at least one of the first or the second floating point operand by transforming the first and the second floating point operand by a compressing function; (iii) computing as a result depending on the arithmetic operation a sum of the transformed floating point operands, a first difference or a second difference of the transformed floating point operands, wherein for the first difference the second floating point operand is subtracted from the first floating point operand and for the second difference the first floating point operand is subtracted from the second floating point operand and computing a corresponding result plus one by additionally adding a value of one to the result; (iv) generating injection values for rounding a final result in dependence of the first and second floating point operands being in a decimal floating point format or a binary floating point format, of a rounding mode and of the arithmetic operation; (v) generating injection carry values based on the transformed first and second floating point operands and the injection values; (vi) selecting the final result in signed magnitude form from the result, the result plus one and a least significant digit based on the injection carry values and an end around carry signal.

The present invention comprises, in one or more embodiments, arithmetical engine which combines the add/subtract operation, the shifting, the rounding, and the post rounding correction shift into a single, integrated operation. It advantageously reduces, for example, 9 processing cycles to 3 cycles.

With the present invention, this can be performed with a special injection based rounding scheme. Injection values may be constants depending on the rounding mode selected, the operation, and on the least significant bit of a floating point number.

For BFP a similar injection rounding with end-around-carry scheme can be applied as for DFP. But DFP operates on 4-bit digits and BFP operates on bits. Thus, there exist different rounding points, and the injection vectors have different widths and values.

Duplicating the rounding logic would add to the area and the delay of the timing critical path. The present invention advantageously maps the BFP rounding and its corrections onto the DFP dataflow without increasing the logic depths/delay of that timing critical circuitry. This is how the least significant bit (L), the guard bit (G), the rounding bit (R) and the sticky bit (S) of BFP can be mapped onto the L, G, R, S digits of the DFP solution.

In one or more embodiments, in case of the floating point numbers being in a binary floating point format, the fields of the mapped first and second floating point numbers may comprise bits with value zero padded to form digits in order to share the same fields as in case of the floating point numbers being in a decimal floating point format. Thus, it is possible to apply a decimal floating point operation to floating point numbers in binary format.

Advantageously, the inventive method disclosed may comprise generating injection carry values depending on the injection values if for rounding reasons the result plus one is selected for the final result.

Favorably, the method presented may further comprise selecting the final result of the rounding process based on the injection carry values generated depending on the injection values as well as on the arithmetic operation being an add or a subtract operation. Injection values are such that injection carry values are generated if for rounding reasons the result plus one is selected instead of the result.

Advantageously, after alignment of the third operand and the fourth operand, an exponent of the third operand may be equal to an exponent of the fourth operand, thus enabling a convenient and efficient further processing of the operands according to one or more aspects of the present invention.

In one or more embodiments, a leading zero counter or an anticipator may be used for determining the number of bits that need to be shifted out for normalizing the result of the add/subtract operation. By this way, it is ensured that the full range of bits in a mantissa of a floating point intermediate result can be used for the final result of an arithmetic operation. The use of a counter to determine the number of leading zeroes may be favorable, because there could be a difference of one position between using an anticipator and a counter.

In an advantageous embodiment, rounding or normalizing the result of the floating point add/subtract operation may be provided, depending on a relative difference of the exponents of the first and the second operand, enhancing thus the efficiency of the inventive method compared to conventional arithmetic solutions. An advantage of the inventive method is that only one post-operation process is necessary, rounding or normalizing, depending on a difference of the exponents of the operands. Thus rounding and normalizing may be performed in parallel.

Favorably, for the relative difference of the exponents of the first and the second operand being greater than 1, the result of the floating point add/subtract operation may be shifted by at most 1 bit and rounded. This may be advantageous, if the exponents of the first and the second operand differ largely in size, e.g. more than a value of 1, the so-called far case.

In another case, for the relative difference of the exponents of the first and the second operand being less than 2, the leading zero anticipator may be used for counting the leading zeroes and the result of the floating point add/subtract operation may be shifted by the number of leading zeroes. This may be advantageous, if the exponents of the first and the second operand are roughly in the same size, e.g. the exponents differ less than 2, the so-called near case.

In an advantageous embodiment of the invention, the method may be implemented in a pipelined version. The inventive method thus may be used in a pipelined version in an efficient embodiment, but is not restricted to such an implementation.

According to one or more aspects of the present invention, a floating point unit is provided, configured for performing binary or decimal floating point arithmetic calculations as described herein.

According to a further advantageous aspect of the invention, a data processing program for execution in a data processing system is proposed comprising an implementation of an instruction set for performing a method as described herein when the data processing program is run on a computer.

Further a computer program product is favorably proposed comprising a computer usable medium including a computer readable program, wherein the computer readable program when executed on a computer causes the computer to perform decimal and binary floating point arithmetic calculations in a floating point unit on a first operand and a second operand, wherein the first operand and the second operand are both in the same of either decimal or binary floating point format, wherein the first operand has a first magnitude and the second operand has a second magnitude, the method comprising: (i) receiving the first operand and the second operand in packed format; (ii) unpacking the first operand and the second operand; (iii) swapping the first operand to a fourth operand and the second operand to a third operand, if an exponent of the first operand is less than an exponent of the second operand, otherwise storing the first operand to a third operand and the second operand to a fourth operand; (iv) aligning the third operand and the fourth operand based on the exponent difference of the third and fourth operand and a number of leading zeroes of the third operand; (v) performing an add/subtract operation on the aligned third operand and the aligned fourth operand with normalizing and rounding between the third operand and the fourth operand; and (vi) packing the result obtained from this operation.

Referring now to drawings, like elements are referred to with equal reference numerals. Note that the drawings are shown as exemplary embodiments, and are presented by way of example only.

FIG. 1 shows a 64 b binary floating point unit (FPU) based on a fused multiply add operation (FMA) according to the state of the art. State of the art binary FPUs are based on an FMA structure to support the IEEE-754-2008 standard in an efficient and high performing manner. The basic operation of an FMA operation is: R=A*B+C, where R is the result of the FMA operation, and A, B, C are floating point numbers. The FMA operation gets executed in the following steps, as illustrated in FIG. 1:

Multiply A*B in order to get a product 80 and in parallel align the addend 82 relative to the product 80;

The adder computes sum or absolute difference 84; the mantissa operands and result are in sign-magnitude representation;

Normalization: count a number of leading zeroes lz in 86, normalize the mantissa shifting out the leading zeroes to get the value 88, and adjust the exponent accordingly;

Round: evaluate rounding decision in step 90 based on sign, sticky bits 52, guard bit 50, least significant bit 42, and rounding mode, taking into account the sticky bits 54 of the addend 82; the value in box 89 is the incremented mantissa 88, as is needed in order to get the result mantissa 20, and perform post rounding corrections, check range and special results.

For a fast, but area efficient, BFP-128b implementation, the add/subtract operation should be fully pipelined, while the multiply and FMA can be executed in a multi-cycle fashion, i.e., using a 113 b×18 b multiplier and assembling the product in 7 cycles. The drawback of the FMA based BFU executing R=A+/−C is that it can only shift the C operand. Given the 113 b mantissa of BFP-128b, such an add/subtract operation therefore requires a 231 b wide shifter (2*n+5=2*113+5).

The dataflow of the 64 b BFU is too narrow even for a simple BFP-128b add. That requires complex data operations in the BFU and accounts for a higher latency.

Advantageous is a wider dataflow, which is obviously larger and slower, but without slowing down the BFP-64 b arithmetic. Favorably this can be done with virtually no extra hardware using the inventive method.

Figure 2:
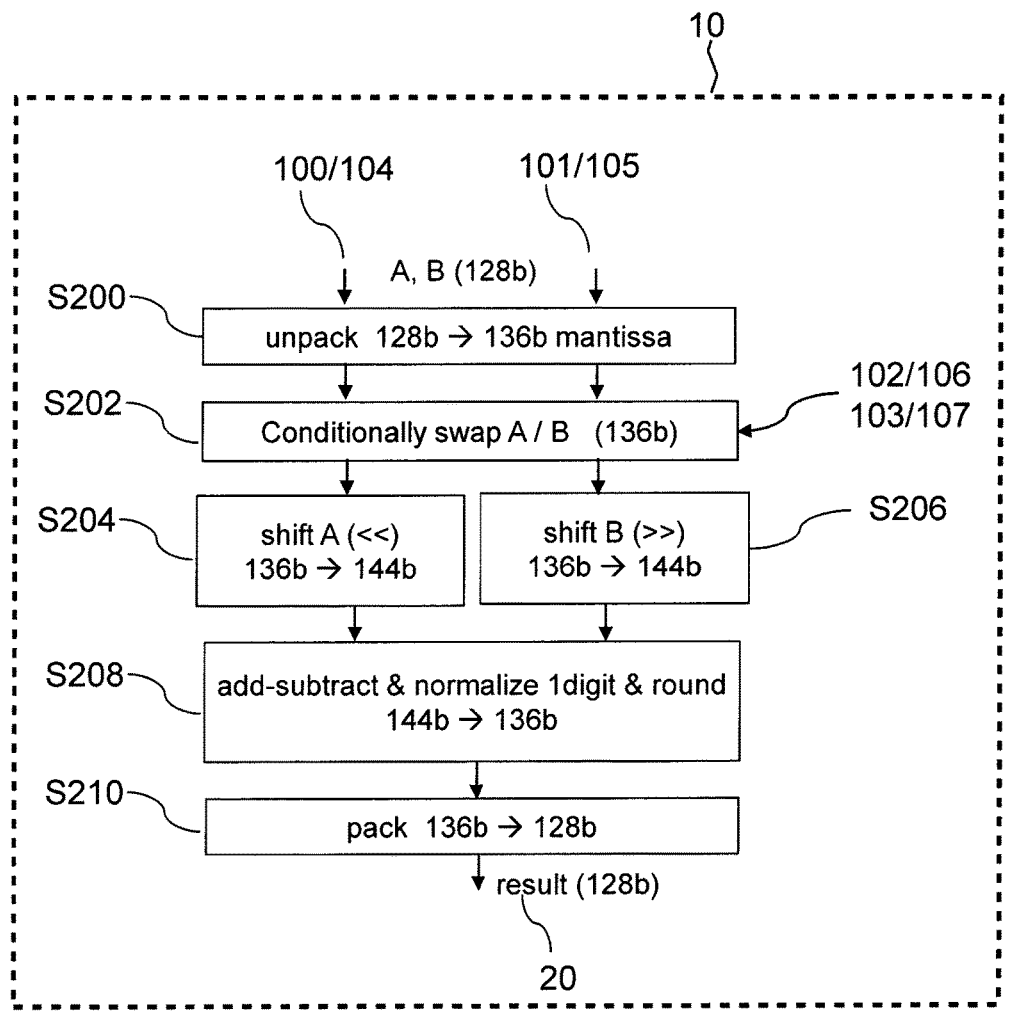
FIG. 2 illustrates an execution scheme of a 128 b decimal floating point add arithmetic operation, according to one or more aspects of the present invention.

FIG. 2 depicts an execution scheme of a 128 b decimal floating point add arithmetic operation according to an embodiment of the present invention. FIG. 2 shows the execution scheme of a DFP add operation and how that maps on the DFU data flow. The exemplary method covers performing decimal and binary floating point arithmetic calculations in a floating point unit 10 on a first operand 100 and a second operand 101, wherein the first operand 100 and the second operand 101 are both in the same floating point format, that is, in either decimal or binary floating point format, wherein the first operand 100 has a first magnitude and the second operand 102 has a second magnitude and wherein the arithmetic calculations comprise binary or decimal arithmetic calculations. In FIG. 2 in the different steps, the first operand 100 as well as the third operand 102 is denominated with A and the second operand 101 as well as the fourth operand 103 is denominated with B, instead of the reference numerals.

In one or more embodiments, the method includes: after receiving the first operand 100 and the second operand 101 in packed format, in step S200 unpacking the first operand 100 and the second operand 101, and in step S202 swapping the first operand 100 to a fourth operand 103 and the second operand 101 to a third operand 102, if an exponent 104 of the first operand 100 is less than an exponent 105 of the second operand 101, otherwise storing the first operand 100 to a third operand 102 and the second operand 101 to a fourth operand 103; in step S204 aligning the third operand 102 and the fourth operand 103 based on the exponent difference of the third and fourth operand 102, 103 and a number of leading zeroes of the third operand 102; and in step S208 performing an add/subtract operation on the aligned operands 102, 103 with normalizing or rounding between the third operand 102 and the fourth operand 103; whereas in step S210 packing the result 20 obtained from this operation.

The mantissa dataflow is between 136 b and 144 b wide. Thus unpacking the operands 100, 102, e.g., means formatting the 128 b operands 100, 102 to a 136 b mantissa width, whereas packing means formatting back from a 136 b mantissa width to a floating point number of 128 b width. The DFU conditionally swaps and aligns both operands A and B. When executing a BFP-128b add operation (113 b mantissa) on such a dataflow, the arithmetic can be done with a 116 b wide adder, since the second operand 102 only sticks out to the right, not to the left. Thus, the DFU with a 136 b mantissa dataflow is wide enough for a BFP-128b operation.

Swapping the first operand 100 and the second operand 101 is performed, if the exponent 104 of the first operand 100 is lower than the exponent 105 of the second operand 101.

The inventive concepts disclosed herein may be implemented in a pipelined version, but are not restricted to be implemented in a pipelined version.

Figure 3:
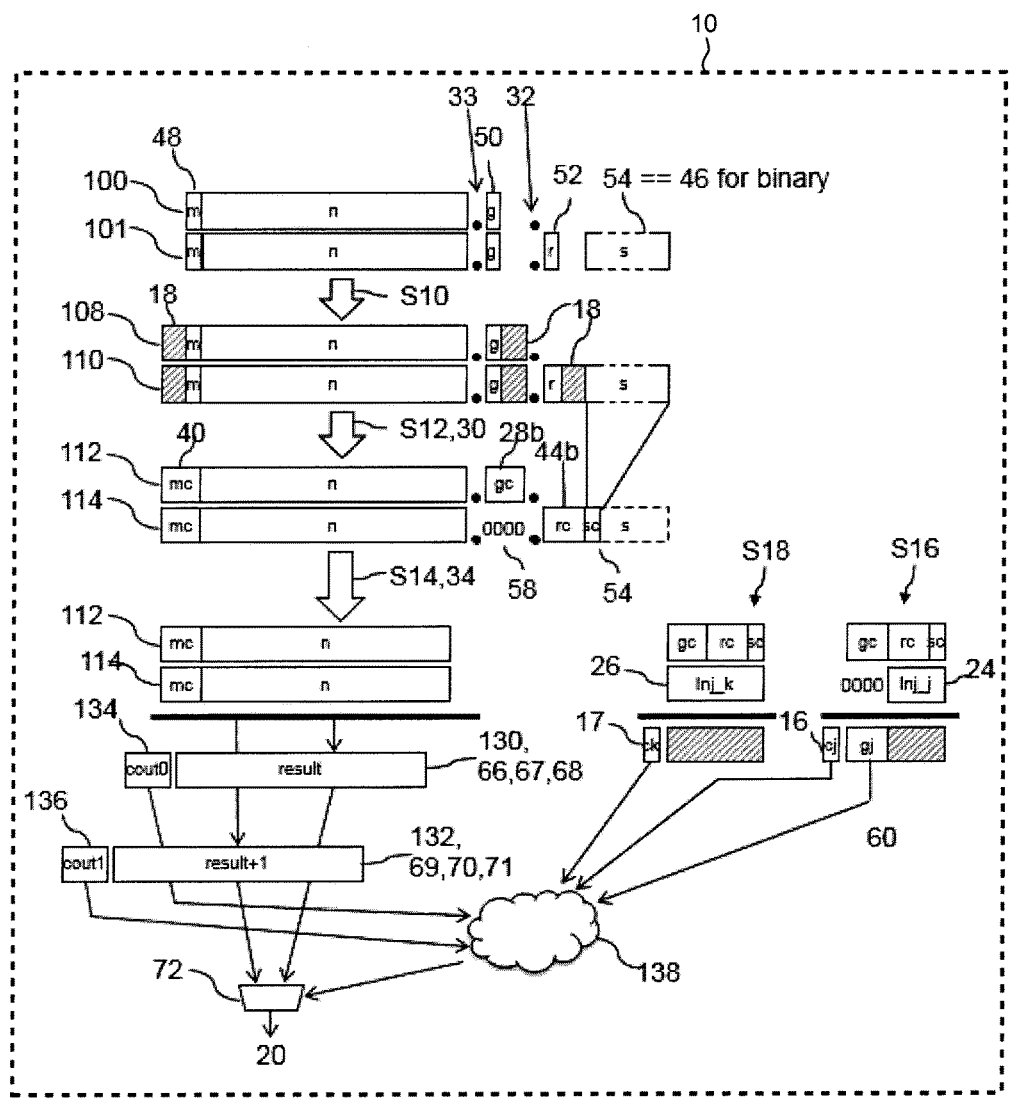
FIG. 3 shows a schematics of a floating point add/subtract arithmetic operation with two floating point operands, according to one or more aspects of the present invention.

FIG. 3 shows a schematic for a floating point add/subtract arithmetic operation with two floating point operands 100, 101, according to one or more embodiments of the present invention. The binary floating point operands 100, 101 of a length of n+1 bits exhibit a most significant bit 48, also two rounding positions 32, 33 and guard bits 50, round bits 52, as well as one or more sticky bits 54.

In FIG. 3, an implementation of the present invention is depicted on an floating point unit 10 for performing a floating point arithmetic add/subtract operation on a first floating point operand 100 and a second floating point operand 101. Herein, the first floating point operand 100 has a first magnitude and the second floating point operand 101 has a second magnitude, and the first and second floating point operands 100, 101 can be either in binary or decimal floating point format. The inventive method comprises, first in case of the floating point operands 100, 101 being in a binary floating point format, mapping the binary floating point operands 100, 101 to a decimal floating point format, by padding bits 18 to form digits in order to share the same fields as in case of the floating point operands 100, 101 being in a decimal floating point format.

In case of the floating point operands 100, 101 being in a decimal floating point format, the padding step may be omitted and the floating point operands 100, 101 directly fed to the next step of the inventive method.

Second, the method comprises generating a guard digit 28 of zero 58 of at least one of the first or the second floating point operand 108, 110 by transforming the first and the second floating point operand 108, 110 by a compressing function 30.

Third, the method comprises computing as a result 130 depending on the arithmetic operation a sum 66 of the transformed floating point operands 112, 114, a first difference 67 or a second difference 68 of the transformed floating point operands 112, 114, wherein for the first difference 67 the second floating point operand 114 is subtracted from the first floating point operand 112 and for the second difference 68 the first floating point operand 112 is subtracted from the second floating point operand 114 and computing a corresponding result plus one 132 by additionally adding a value of one to the result 130. Correspondingly a sum plus one 69, a first difference plus one 70 and a second difference plus one 71 is calculated.

Fourth, the method comprises generating injection values 24, 26 for rounding a final result 20 in dependence of the first and second floating point operands 100, 101 being in a decimal floating point format or a binary floating point format, of a rounding mode and of the arithmetic operation.

Figure 4:
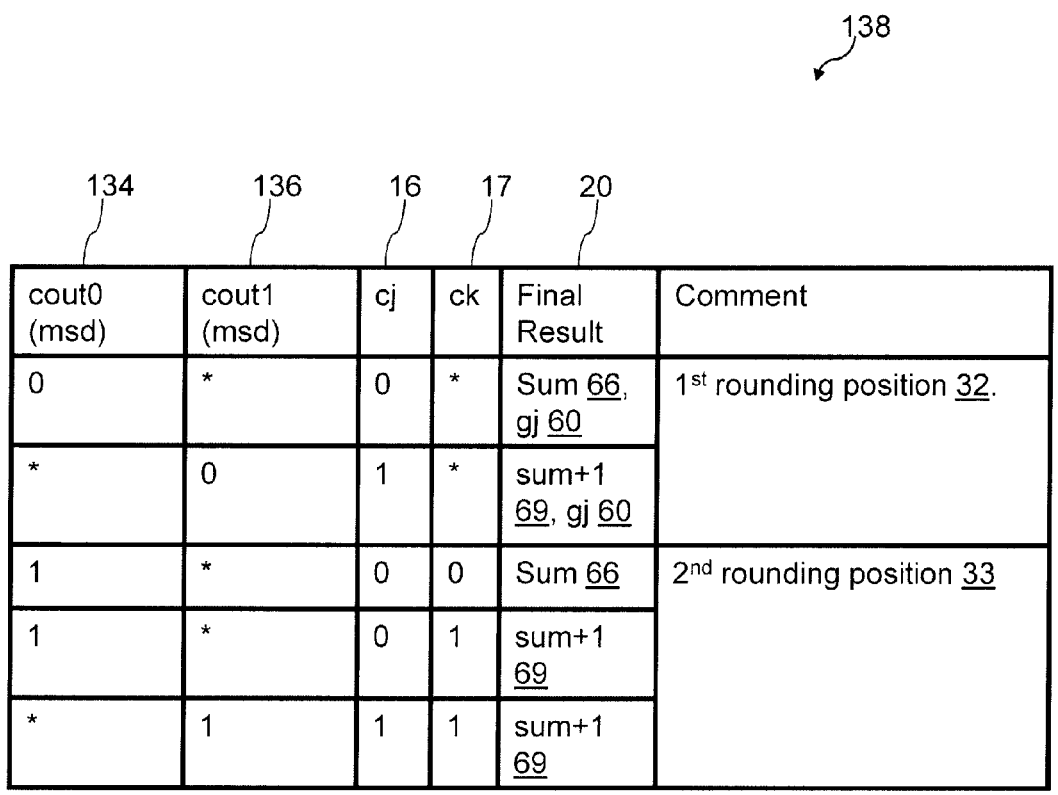
FIG. 4 depicts a decision table for selecting a final result of a floating point arithmetic operation, according to one or more aspects of the present invention.

Fifth, the method comprises generating injection carry values 16, 17 based on the transformed first and second floating point operands 112, 114 and the injection values 24, 26 and sixth, the method comprises finally selecting the final result 20 in signed magnitude form from the result 130, the result plus one 132 and a least significant digit 60 based on the injection carry values 16, 17 and an end around carry signal 134, 136, represented as the LSB/LSD carry with injection rounding, as is detailed in the table 138 contained in FIG. 4.

Thus the floating point unit 10 according to one or more aspects of the present invention may be configured to perform rounding the final result 20 of the arithmetic operation, where the rounding includes: (i) generating injection values 24, 26 depending on the floating point format; (ii) transforming the first and the second floating point operand 108, 110 by a compressing function 30; (iii) detecting the rounding position depending on injection carry values 16, 17; and (iv) combining the rounding process with a calculation of the sum 66 and the first and second differences 67, 69 of the first and second floating point operands 112, 114.

In case of the floating point operands 100, 101 being in binary floating point format, the fields of the mapped first and second floating point operands 108, 110 comprise bits 18 with value zero padded to form digits in order to share the same fields as in case of the floating point operands 100, 101 being in a decimal floating point format. This mapping step S10, shown in FIG. 3, creates new floating point operands 108, 110. Also, the guard bits 50 and the round bits 52 are padded with bits 18 in order to create guard digits and round digits of 4 bit length as well as the most significant bits 48, which are padded to most significant digits 40.

Next, in step S12 a compressing function, such as a carry save adder (CSA), is applied to the floating point operands 108, 110. Thus, a guard digit 28 of zero, shown as four zeroes 58 in FIG. 3, a so-called 'hole', of the second floating point operand 114 is generated by transforming the first and the second floating point operand 108, 110 by the compressing function 30 in step S12 and creating the floating point operands 112, 114, resulting also in the guard digits 28*b* and round digits 44*b*. The sticky field 54 may be reduced to a single sticky bit in this compressing process using e.g. an OR gate.

The final result 20 of the arithmetic operation is determined by using, for example, a decimal compound adder 34 in step S14, where performing an add/subtract operation with an injection rounding step. There the final result 20 is selected as the sum 66 or the sum plus one 68, which are calculated in parallel, depending on digit overflow resulting from performing the arithmetic operation in the decimal compound adder 34. The final result 20 of the rounding process is then selected based on the injection carry values 16, 17, generated depending on the injection values 24, 26 based on the table 138 in FIG. 4. Injection values 24, 26 are constants depending on the rounding mode selected and on the least significant bit of a floating point operand.

Step S16 shows the carry generation for the first rounding position 32, whereas step S18 shows the carry generation for the second rounding position 33. The injection carry values 16, 17 are fed to the decision table 138, shown in FIG. 3 and explained in FIG. 4. The output of table 138 is fed as input for the multiplexer 72 in order to select the result 130 or the result plus one 132 from the decimal compound adder 34 as a final result 20.

In FIG. 4, a decision table 138 for selecting a final result 20 of a floating point arithmetic operation according to an embodiment of the invention is shown. Depending on the end around carry signals 134 (carry-out-0) or 136 (carry-out-1) of the result of the decimal compound adder 34 as well as the injection carry values 16, 17 a final result 20 of the sum 66, and the least significant digit 60 or of the sum plus one 69 and the least significant digit 60 is selected for the first rounding position 32. For the second rounding position 33 a final result 20 is selected from the sum 66 or the sum plus one 69 values depending on the end around carry signals 134, 136 of the result of the decimal compound adder 34 as well as the injection carry values 16, 17.

Figure 5:
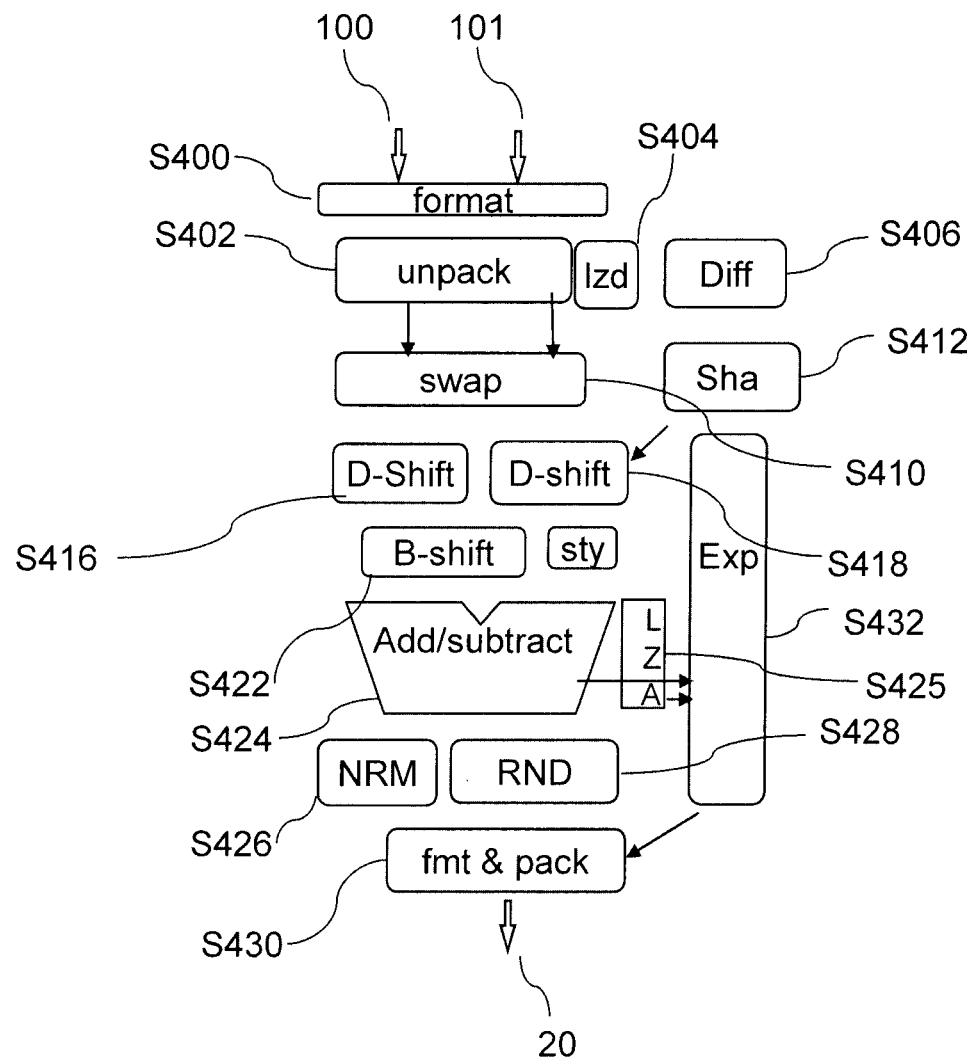
FIG. 5 illustrates schematics for mapping a binary floating point add arithmetic operation onto a decimal floating point dataflow, according to one or more aspects of the present invention.

FIG. 5 depicts a schematic for mapping a binary floating point add arithmetic operation onto a decimal floating point dataflow according to an embodiment of the invention. It shows a fully pipelined DFU dataflow with the extensions needed to execute BFP-128b. The first and second operands 100, 101 are received by the formatting step S400 in packed format. Then, the first and second operands 100, 101, if in decimal format, are unpacked in step S402 and a leading zero detection is performed in step S404. In step S406 a difference of both exponents 104 and 106 of the operands 100, 101 is determined. S412 determines information for the shifting operation in S418. In step S410 both operands 100, 101 are swapped, depending on the exponents and in steps S416, for DFP, and in S418 for DFP and BFP, the digits shifts are performed, whereas in step S422 the bit shifts are performed, leading to an input for the add/subtract operation in step S424, using a leading zero anticipator S425 for determining the number of leading zero bits of the sum to be used by normalizing in step S426 or rounding in step S428 the result of the add/subtract operation of step S424. In step S432 the result exponent of the normalized or rounded sum is determined. In step S430 a final formatting and packing operation is performed in order to get the final result 20 as an output.

Figure 6:
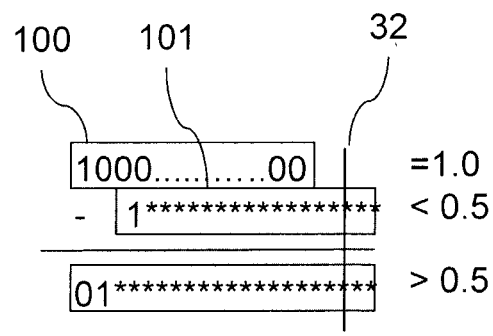
FIG. 6 depicts an alignment of a first and second operand for a difference of the exponents being greater than one, according to one or more aspects of the present invention.

Decimal arithmetic is thus carried out on BCD digit vectors, whereas binary arithmetic is performed on bit vectors. So, a bit shifter is added (S422) for shifting by 0, 1, 2, or 3 bits. The add/subtract operation in S424 supports binary add/subtract and BFP rounding as well as decimal add/subtract and decimal rounding FIG. 6 depicts in a schematic implementation of an alignment of a first and second operand 100, 101 according to an embodiment of the present invention for a difference of the exponents 104, 105 being greater than one. For BFP add/subtract operations, near and far cases may be distinguished based on the exponent 104, 105 difference of the first and second operand 100, 101. The inventive method presented herein comprises rounding or normalizing the result 20 of the add/subtract operation, depending on a relative difference of the exponents 104, 105 of the first and the second operand 100, 101. The rounding position 32 is marked in the FIG. 5. For the so-called far case with a difference of the exponents 104, 105 being |ea−eb|>1, where ea is the exponent 104 of the first operand 100 and eb is the exponent 105 of the second operand 101, this requires a full alignment shift. The sum can gain at most 1 b and the difference can lose at most 1 b, meaning a cancellation of the most significant bit. The adder result is normalized by at most 1 b, and then rounding is performed. Rounding can be executed via the rounding path of the add/subtract operation of the inventive method. Thus, for the relative difference of the exponents 104, 105 of the first and the second operand 100, 101 being greater than 1, the result 20 of the add/subtract operation is shifted by at most 1 bit and rounded.

Figure 7:
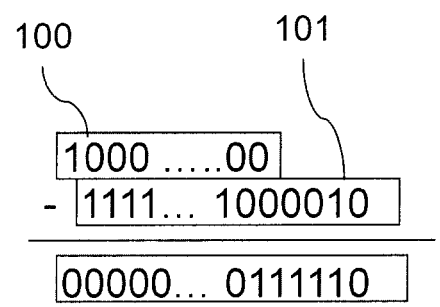
FIG. 7 shows an alignment of a first and second operand for a difference of the exponents being less than 2, according to one or more aspects of the present invention.

FIG. 7 depicts an alignment of a first and second operand 100, 101 according to a further embodiment of the present invention for a difference of the exponents being less than 2. For the so-called near case with a difference of the exponents 104, 105 being |ea−eb|<2, where ea is the exponent 104 of the first operand 100 and eb is the exponent 105 of the second operand 101. When computing an absolute difference, massive cancellation of most significant bits at the left end of the result can occur. A leading zero anticipator is used to anticipate the number of leading zeroes. The adder result then uses a full width normalization shift instead of a rounding operation. That accounts for the additional leading zero anticipator and normalizer. Thus for the relative difference of the exponents 104, 105 of the first and the second operand 100, 101 being less than 2, using the leading zero anticipator 112 for counting the leading zeroes and shifting the result 20 of the add/subtract operation by the number of leading zeroes is performed.

Figure 8:
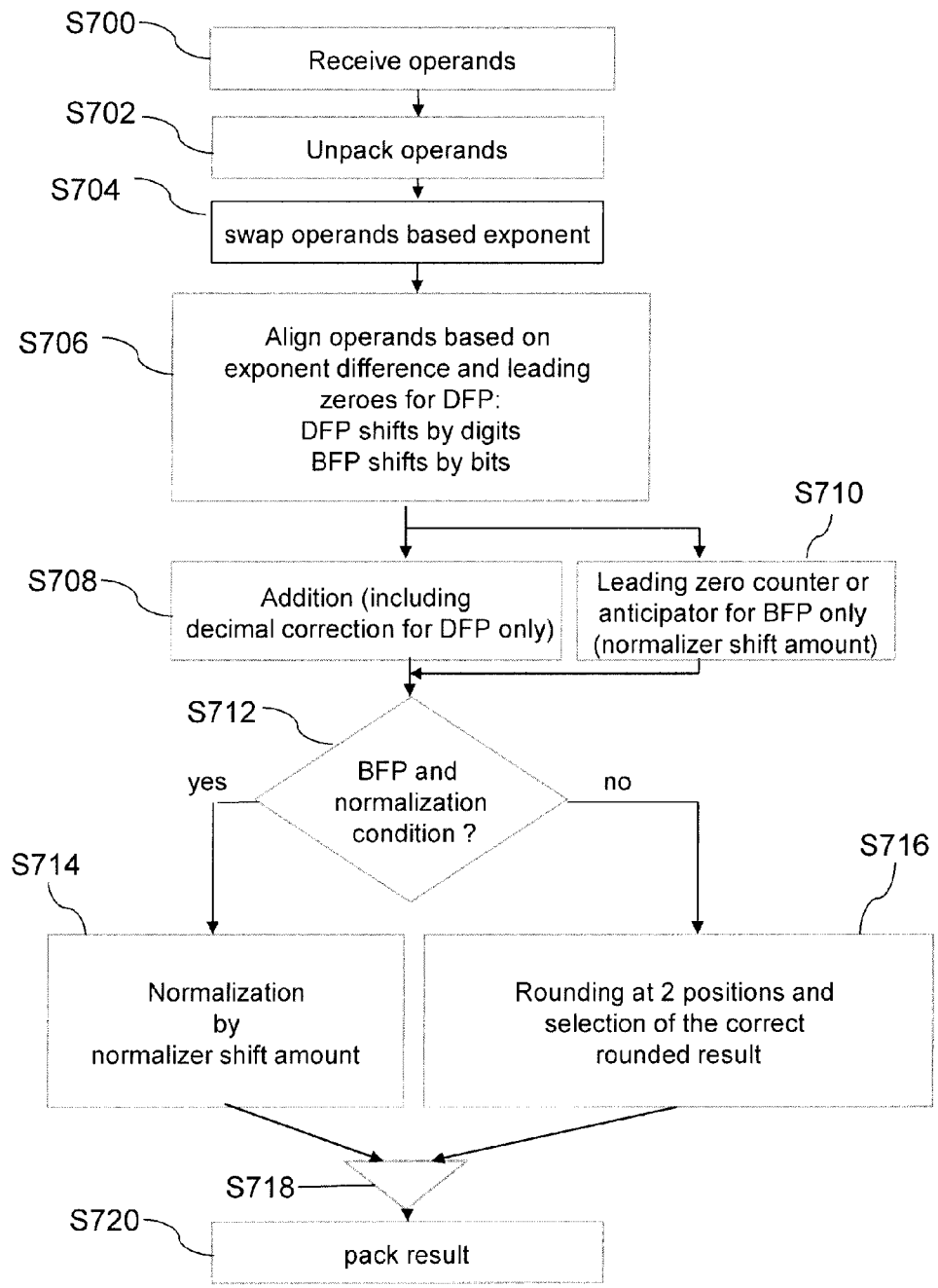
FIG. 8 depicts a flowchart of one embodiment for performing decimal and binary arithmetic calculations in a floating point unit for a difference of the exponents being less than two, according to one or more aspects of the present invention.

In FIG. 8, a flowchart is shown explaining how to perform decimal and binary arithmetic calculations in a floating point unit 10 according to an embodiment of the invention for a difference of the exponents being less than two.

In one or more embodiments, the inventive process may include, after the first operand 100 and the second operand 101 are received in packed format in step S700, in step S702 the first operand 100 and the second operand 101 are unpacked. Next in step S704. the first operand 100 and the second operand 101 are swapped if the exponent 104 of the first operand 100 is lower than the exponent 105 of the second operand 101 in order to result in a third and a fourth operand 102, 103 with corresponding exponents 106, 107. In step S706 the alignment takes place based on the difference of the exponents 106 and 107. If the operands 102, 103 exhibit binary floating point format, an additional bit alignment by 0, 1, 2, or 3 is included. Step S708 performs an add/subtract operation including a decimal correction in the case of DFP operation, whereas for a BFP operation in step S710 a leading zero anticipation is additionally performed in parallel. Then, before proceeding to a rounding process as in DFP operation, a decision is made in step S712 if a massive cancellation of most significant bits is possible, based on a difference in the exponents 106, 107 and the effective add/subtract operation. If the massive cancellation is possible, being a special event for BFP operation, a normalization by the anticipated leading zeroes with a left shift of the operand and an exponent correction is performed in step S714. Alternatively, if massive cancellation is not possible rounding at two rounding positions 32, 33 as well as a selection of the correct rounded result is performed in step S716. Next, the normalized or rounded result 20 obtained from the operation before is selected in step S718 and finally the result 20 is packed again in step S720.

Figure 9:
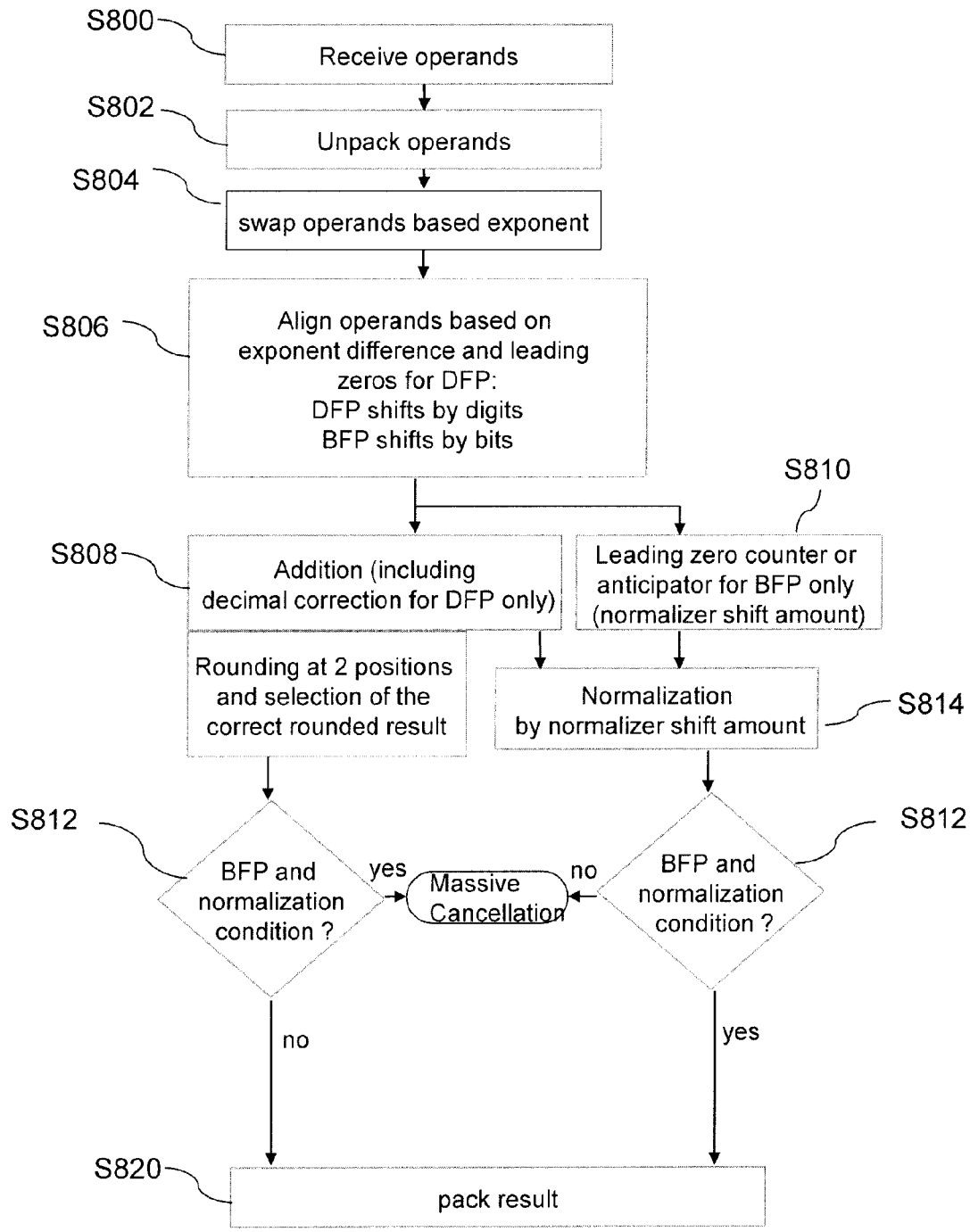
FIG. 9 depicts a flowchart of one embodiment for performing decimal and binary arithmetic calculations in a floating point unit for a difference of the exponents being greater than one, according to one or more aspects of the present invention.

In FIG. 9 a flowchart is shown explaining how to perform decimal and binary arithmetic calculations in a floating point unit 10 according to one or more embodiments of the invention for a difference of the exponents being greater than one.

The flowchart of FIG. 9 is very similar to the flowchart shown in FIG. 8, in particular, concerning the steps S800 to S808 and S810. Rounding at two rounding positions 32, 33, as well as a selection of the correct rounded result is performed in this case directly in step S808, whereas a normalization by the anticipated leading zeroes with a left shift of the operand and an exponent correction is performed in step S814. Then, before proceeding, a decision is made in steps S812 for a massive cancellation of most significant bits being possible, based on a difference in the exponents 104, 105 and the effective add/subtract operation and if yes, the normalization is performed. Next, the normalized or rounded result 20 obtained from the operation is packed again in step S820.

Figure 10:
FIG. 10 depicts a decision table for rounding or normalization a final result based on the exponent difference of the third and fourth operand, according to one or more aspects of the present invention.

FIG. 10 depicts a decision table for rounding or normalization the final result 20 based on the difference of the corresponding exponents 106, 107 of the third and fourth operand 102, 103 according to an embodiment of the present invention. Depending on the floating point arithmetic operation being an addition or a subtraction, and depending on the difference of the exponents 106, 107 being zero, one or greater than one the result of the arithmetic operation is rounded or normalized.

Figure 11:
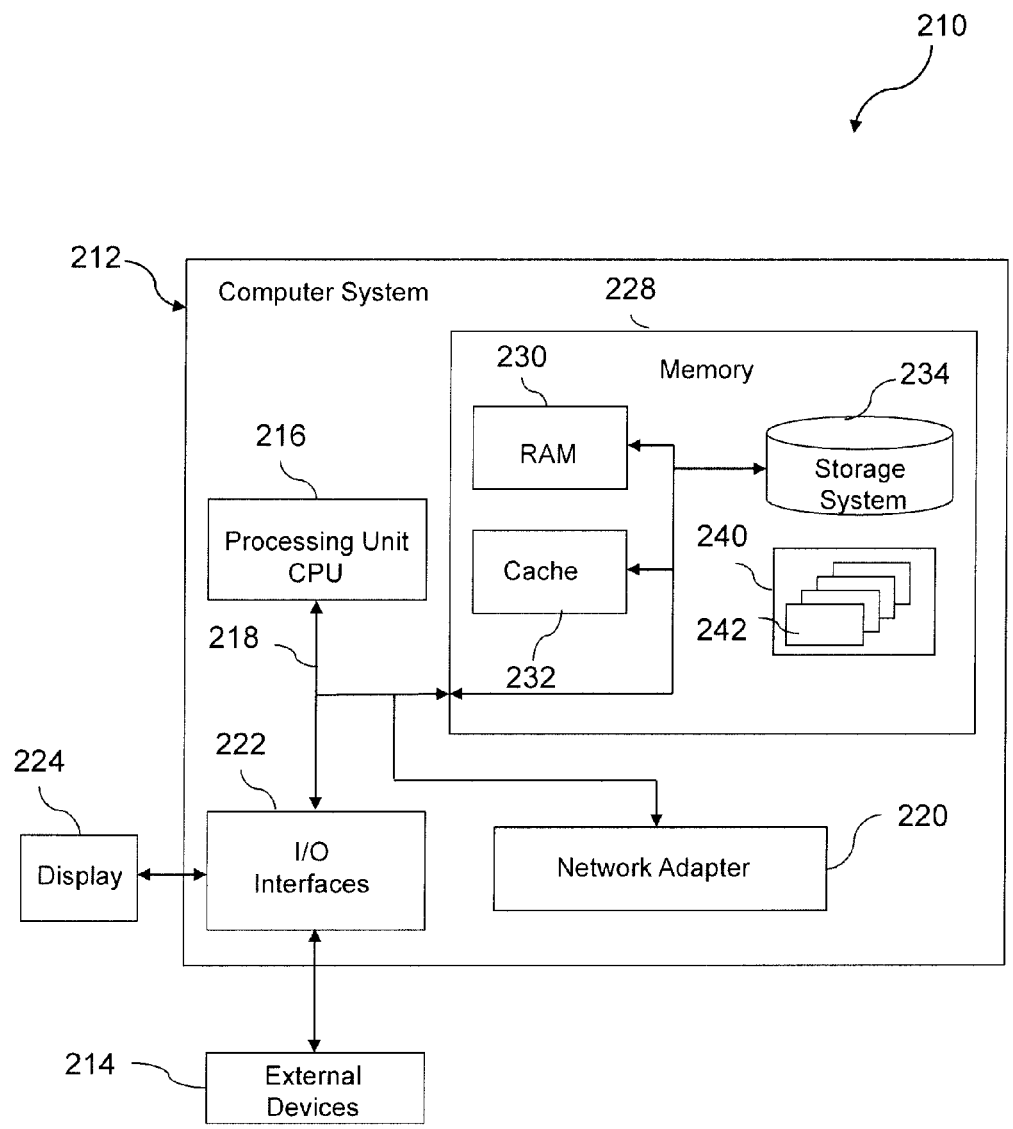
FIG. 11 shows an example embodiment of a data processing system with an arithmetic logic circuitry for implementing a method according to one or more aspects of the present invention.

FIG. 11 depicts an example embodiment of a data processing system 210 with a decimal floating point unit 10 configured for performing binary or decimal arithmetic calculations, implementing a method according to the invention. The decimal floating point unit 10, which is not shown explicitly in FIG. 11, may be part of the processing unit 216 of the data processing system 210.

Referring now to FIG. 11, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

The block diagrams in the FIGS. illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method comprising:
   configuring a computing environment to facilitate processing with the computing environment, including providing an integrated unit to process operands in multiple floating point formats, the configuring including:
   providing, as the integrated unit, a hardware decimal floating point unit for the computing environment that performs operations and increases throughput within the computing environment, the hardware decimal floating point unit being configured to process operands in decimal floating point format and operands in binary floating point format in a same hardware decimal floating point unit, the same hardware decimal floating point unit configured to:

perform decimal and binary floating point arithmetic calculations in the decimal floating point unit on a first operand and a second operand, wherein the first operand and the second operand are both in either decimal or binary floating point format, and the first operand has a first magnitude and the second operand has a second magnitude, the performing comprising:

receiving at the same hardware decimal floating point unit the first operand and the second operand in packed format;

unpacking the first operand and the second operand;

swapping the first operand to a fourth operand and the second operand to a third operand, if an exponent of the first operand is less than an exponent of the second operand, otherwise storing the first operand to the third operand and the second operand to the fourth operand;

aligning the third operand and the fourth operand based on the exponent difference of the third and fourth operand and a number of leading zeroes of the third operand;

performing an arithmetic operation on the aligned third operand and the aligned fourth operand with normalizing or rounding between the third operand and the fourth operand to obtain a result, where performing with the arithmetic operation the normalizing or the rounding is dependent on a relative difference of the exponents of the first and second operands and where the normalizing or the rounding is performed as part of an integrated operation with the arithmetic operation; and packing the result obtained from the performing for the arithmetic operation;

providing a binary floating point unit for the computing environment, the binary floating point unit being of reduced size for the computing environment based on the providing of the hardware decimal floating point unit that processes operands in decimal floating point format and operands in binary floating point format; and wherein the configuring facilitates processing performance within the computing environment, including reducing latency of operations and increasing throughput within the computing environment by processing operands in binary floating point format within the same hardware decimal floating point unit with processing operands in decimal floating point format.

2. The method of claim 1, wherein performing the arithmetic operation with normalizing or rounding between the third operand and the fourth operand comprises:

in case of the first and second operands being in binary floating point format, mapping the binary operands to decimal floating point format, by padding bits to form digits in order to share common fields as in case of the operands being in the decimal floating point format;

generating a guard digit of zero of at least one of the first or the second operand by transforming the first and the second operands by a compressing function;

determining as the result depending on the arithmetic operation, a sum of the transformed operands, and a first difference or a second difference of the transformed operands, wherein for the first difference the second point operand is subtracted from the first point operand and for the second difference the first operand is subtracted from the second operand, and determining a corresponding result plus one by additionally adding a value of one to the result;

generating injection values for rounding a final result in dependence of the first and second operands being in a decimal floating point format or a binary floating point format, and in dependence of a rounding mode selected and of the arithmetic operation;

generating injection carry values based on the transformed first and second operands and the injection values; and selecting the final result from the result, the result plus one and a least significant digit based on the injection carry values and end around carry signals.

3. The method of claim 2, wherein, in case of the first and second operands being in binary floating point format, the mapped operands fields comprise bits with value zero padded to form digits in order to share the same fields as in case of the operands being in decimal floating point format.

4. The method of claim 2, wherein generating injection carry values depending on the injection values if for rounding reasons the result plus one is selected as the final result.

5. The method of claim 2, wherein selecting the final result based on the injection carry values generated depending on the injection values as well as on the arithmetic operation being an add or a subtract operation.

6. The method of claim 1, wherein after alignment of the third operand and the fourth operand, an exponent of the third operand is equal to an exponent of the fourth operand.

7. The method of claim 1, wherein using a leading zero anticipator or a counter for determining a number of bits for normalizing the result of the add/subtract operation.

8. The method of claim 1, wherein the rounding or normalizing between the third operand and the fourth operand is performed depending on a difference of the exponents of the third and the fourth operands.

9. The method of claim 8, wherein for the difference of the exponents of the first and the second operands being greater than 1, the result of the arithmetic operation is shifted by at most 1 bit and rounded.

10. The method of claim 8, wherein for the difference of the exponents of the first and the second operands being less than 2, using a leading zero anticipator for counting the leading zeroes and shifting the result of the arithmetic operation by the number of leading zeroes.

11. The method of claim 1, further comprising implementing the performing decimal and binary floating point arithmetic calculations in a pipelined manner.

12. A computer system facilitating processing within a computing environment by processing operands in multiple floating point formats in an integrated unit, the computer system comprising:

the integrated unit, the integrated unit being a hardware decimal floating point unit that performs operations and increases throughput within the computing environment, the hardware decimal floating point unit being a decimal floating point unit that processes operands in decimal floating point format and operands in binary floating point format in a same hardware decimal floating point unit, the same hardware decimal floating point unit configured to:

perform decimal and binary floating point arithmetic calculations in the decimal floating point unit on a first operand and a second operand, wherein the first operand and the second operand are both in either decimal or binary floating point format, and the first operand has a first magnitude and the second operand has a second magnitude, the same hardware decimal floating point unit to perform:

unpacking the first operand and the second operand;

swapping the first operand to a fourth operand and the second operand to a third operand, if an exponent of the first operand is less than an exponent of the second operand, otherwise storing the first operand to the third operand and the second operand to the fourth operand;

aligning the third operand and the fourth operand based on the exponent difference of the third and fourth operand and a number of leading zeroes of the third operand;

performing an arithmetic operation on the aligned third operand and the aligned fourth operand with normalizing or rounding between the third operand and the fourth operand to obtain a result, where performing with the arithmetic operation the normalizing or the rounding is dependent on a relative difference of the exponents of the first and second operands and where the normalizing or the rounding is performed as part of an integrated operation with the arithmetic operation; and packing the result obtained from the performing for the arithmetic operation;

a binary floating point unit for the computing environment, the binary floating point unit being of reduced size for the computing environment based on the computing environment including the hardware decimal floating point unit that processes operands in decimal floating point format and operands in binary floating point format; and wherein the hardware decimal floating unit facilitates processing performance within the computing environment, including reducing latency of operations and increasing throughput within the computing environment by processing operands in binary floating point format within the same hardware decimal floating point unit with processing operands in decimal floating point format.

13. The computer system of claim 12, wherein performing the arithmetic operation with normalizing or rounding between the third operand and the fourth operand comprises:

in case of the first and second operands being in binary floating point format, mapping the binary operands to decimal floating point format, by padding bits to form digits in order to share common fields as in case of the operands being in the decimal floating point format;

generating a guard digit of zero of at least one of the first or the second operand by transforming the first and the second operands by a compressing function;

determining as the result depending on the arithmetic operation, a sum of the transformed operands, and a first difference or a second difference of the transformed operands, wherein for the first difference the second operand is subtracted from the first operand and for the second difference the first operand is subtracted from the second operand, and determining a corresponding result plus one by additionally adding a value of one to the result;

generating injection values for rounding a final result in dependence of the first and second operands being in a decimal floating point format or a binary floating point format, and in dependence of a rounding mode selected and of the arithmetic operation;

generating injection carry values based on the transformed first and second operands and the injection values; and selecting the final result from the result, the result plus one and a least significant digit based on the injection carry values and end around carry signals.

14. The computer system of claim 13, wherein, in case of the first and second operands being in binary floating point format, the mapped operands fields comprise bits with value zero padded to form digits in order to share the same fields as in case of the operands being in decimal floating point format.

15. The computer system of claim 13, wherein generating injection carry values depending on the injection values if for rounding reasons the result plus one is selected as the final result.

16. The computer system of claim 13, wherein selecting the final result based on the injection carry values generated depending on the injection values as well as on the arithmetic operation being an add or a subtract operation.

17. The computer system of claim 12, wherein after alignment of the third operand and the fourth operand, an exponent of the third operand is equal to an exponent of the fourth operand.

* * * * *